United States Patent
Player

(10) Patent No.: US 11,978,259 B2
(45) Date of Patent: May 7, 2024

(54) SYSTEMS AND METHODS FOR PARTICLE FILTER TRACKING

(71) Applicant: FORD GLOBAL TECHNOLOGIES, LLC, Dearborn, MI (US)

(72) Inventor: Kevin James Player, Gibsonia, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 17/371,637

(22) Filed: Jul. 9, 2021

(65) Prior Publication Data
US 2023/0012257 A1    Jan. 12, 2023

(51) Int. Cl.
G06V 20/56    (2022.01)
B60W 30/18    (2012.01)
G06F 18/214   (2023.01)
G06N 20/00    (2019.01)

(52) U.S. Cl.
CPC ............ G06V 20/56 (2022.01); B60W 30/18 (2013.01); G06F 18/214 (2023.01); G06N 20/00 (2019.01); *B60W 2420/403* (2013.01); *B60W 2420/408* (2024.01)

(58) Field of Classification Search
CPC .... G06V 20/56; G06V 2201/08; G06V 20/58; B60W 30/18; B60W 2420/42; B60W 2420/52; B60W 2420/403; B60W 2420/48; G06F 18/214; G06N 20/00; G01S 8/4815; G01S 17/86; G01S 17/66; G01S 17/931; G01S 7/4815
See application file for complete search history.

(56) References Cited

U.S. PATENT DOCUMENTS

| 10,621,747 | B2 | 4/2020 | Malisiewicz et al. |
| 11,776,215 | B1 * | 10/2023 | Cheng ................... G06N 5/04 345/419 |
| 2014/0368807 | A1 * | 12/2014 | Rogan ................... G01S 17/89 356/28 |
| 2019/0096086 | A1 | 3/2019 | Xu et al. |
| 2019/0156569 | A1 | 5/2019 | Jung et al. |
| 2019/0180467 | A1 * | 6/2019 | Li ......................... G01S 17/93 |
| 2019/0266741 | A1 | 8/2019 | Uehara |

(Continued)

OTHER PUBLICATIONS

Deng, Z. et al., "Amodal Detection of 3D Objects: Inferring 3D Bounding Boxes from 2D Ones in RGB-Depth Images," IEEE Conf. on Computer Vision and Pattern Recognition (CVPR) 2017.
(Continued)

*Primary Examiner* — Brandon J Miller
(74) *Attorney, Agent, or Firm* — Frank A. MacKenzie; Brooks Kushman P.C.

(57) ABSTRACT

Systems and methods for operating a mobile platform. The methods comprise, by a computing device: obtaining a LiDAR point cloud; using the LiDAR point cloud to generate a track for a given object in accordance with a particle filter algorithm by generating states of a given object over time (each state has a score indicating a likelihood that a cuboid would be created given an acceleration value and an angular velocity value); using the track to train a machine learning algorithm to detect and classify objects based on sensor data; and/or causing the machine learning algorithm to be used for controlling movement of the mobile platform.

20 Claims, 12 Drawing Sheets

(56) References Cited

U.S. PATENT DOCUMENTS

| | | |
|---|---|---|
| 2019/0317519 A1 | 10/2019 | Chen |
| 2019/0355171 A1 | 11/2019 | Ashley |
| 2020/0159225 A1 | 5/2020 | Zeng et al. |
| 2020/0309923 A1* | 10/2020 | Bhaskaran .............. G01S 17/87 |
| 2021/0027546 A1 | 1/2021 | Hao et al. |
| 2021/0149022 A1 | 5/2021 | Kehl et al. |
| 2022/0222889 A1 | 7/2022 | Bhargava et al. |

OTHER PUBLICATIONS

Information about Related Patents and Patent Applications, see section 4 of the accompanying Information Disclosure Statement Letter, which concerns Related Patents and Patent Applications.
International Search Report and Written Opinion dated Jul. 27, 2022 in International Appln. No. PCT/US2022/071770 (11 pages).
International Search Report and Written Opinion dated Feb. 13, 2023 for PCT/US2022/0728808 (8 pages).
U.S. Appl. No. 17/241,637, filed Apr. 27, 2021, Systems and Methods for Producing Amodal Cuboids.

* cited by examiner

SYSTEMS AND METHODS FOR PARTICLE FILTER TRACKING

BACKGROUND

Statement of the Technical Field

The present disclosure relates generally to object tracking systems. More particularly, the present disclosure relates to implementing systems and methods for particle filter tracking.

Description of the Related Art

Modern day vehicles have at least one on-board computer and have internet/satellite connectivity. The software running on these on-board computers monitor and/or control operations of the vehicles. The vehicle also comprises LiDAR detectors and machine learning algorithms trained for detecting and tracking objects in proximity thereto. The LiDAR detectors generate LiDAR datasets that measure the distance from the vehicle to an object at a plurality of different times. These distance measurements can be used for tracking movements of the object, making predictions as to the object's trajectory, and planning paths of travel for the vehicle based on the predicted objects trajectory.

SUMMARY

The present disclosure concerns implementing systems and methods for operating a mobile platform (e.g., an autonomous vehicle). The methods comprise, by a computing device: obtaining a LiDAR point cloud; using the LiDAR point cloud to generate a track for a given object in accordance with a particle filter algorithm; using the track to train a machine learning algorithm to detect and classify objects based on sensor data; and/or causing the machine learning algorithm to be used for controlling movement of the mobile platform.

The particle filter algorithm is configured to generate states of a given object over time. Each state may be defined by a position, a velocity and a heading for the given object at a particular time. Each state has a score indicating a likelihood that a cuboid would be created given an acceleration value and an angular velocity value. The acceleration value and the angular velocity value may comprise random numbers. In some scenarios, the score is generated by: setting a score value for the cuboid equal to zero; generating a first adjusted score by adding to the score value a likelihood of seeing the acceleration value and the angular velocity value in a context; and generating a second adjusted score value be adding to the first adjusted score value a negative squared distance from each data point of said LiDAR point cloud to a closest edge of the cuboid.

The particle filter algorithm may also be configured to: generate an initial cuboid encompassing at least some data points in the LiDAR point cloud; randomly select different sets of acceleration and angular velocity values; create a set of cuboids using the initial cuboid and the different sets of acceleration and angular velocity values; determine a score for each cuboid of the set of cuboids that indicates a likelihood that the cuboid would be created given the respective one of the different sets of acceleration and angular velocity values; identify scores that are less than a maximum score minus a threshold value; and/or remove cuboids from the set of cuboids that are associated with the scores which were identified.

The implementing systems can comprise: a processor; and/or a non-transitory computer-readable storage medium comprising programming instructions that are configured to cause the processor to implement a method for operating a mobile platform.

BRIEF DESCRIPTION OF THE DRAWINGS

The present solution will be described with reference to the following drawing figures, in which like numerals represent like items throughout the figures.

DETAILED DESCRIPTION

Figure 1:
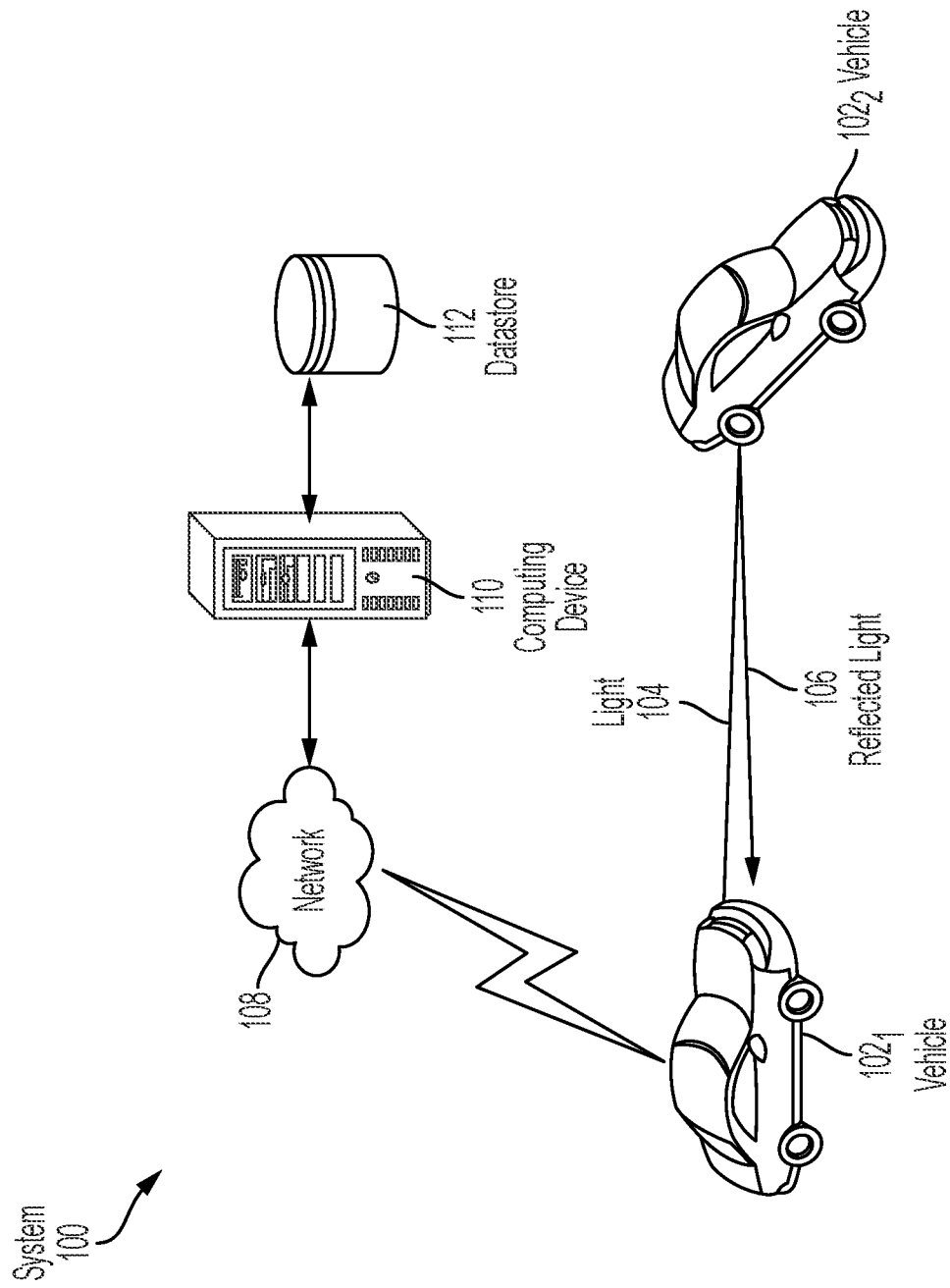
FIG. 1 is an illustration of a system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

In order to assess the performance of the perception pipeline, systems rely on user labeled cuboids and true extent cuboids (amodal cuboids). Labelers label the cuboids in LiDAR space—which provides dimension up to visible ranges and loosely fit to the actual shape of the object. The labeled cuboids thus do not represent the true extent of the object.

This document describes implementing systems and methods that are directed to addressing the problems described above and/or other issues. Accordingly, the present solution concerns systems and methods for producing cuboids, tracks, training machine learning algorithms, and/or controlling mobile platforms (e.g., vehicles) using the same. A cuboid for an object (e.g., a vehicle or pedestrian) is a 3D oriented bounding box that represents (i) a heading of the object, and (ii) a full extent of the object. A track may comprise a plurality of cuboids that are temporally arranged (e.g., to indicate observed and/or predicted motion or movement of the object over time).

The methods generally involve performing the following operations by a computing device: operating a mobile platform (e.g., an autonomous vehicle). The methods comprise, by a computing device: obtaining a LiDAR point cloud; using the LiDAR point cloud to generate a track for a given object in accordance with a particle filter algorithm; using the track to train a machine learning algorithm to detect and classify objects based on sensor data; and/or causing the machine learning algorithm to be used for controlling movement of the mobile platform (e.g., cause autonomous vehicle to drive or travel along a trajectory, cause an articulating arm to extend and/or grip an object, etc.).

The particle filter algorithm is configured to generate states of a given object over time. Each state may be defined by a position, a velocity and a heading for the given object at a particular time. Each state has a score indicating a likelihood that a cuboid would be created given an acceleration value and an angular velocity value. The acceleration value and the angular velocity value may comprise random numbers. In some scenarios, the score is generated by: setting a score value for the cuboid equal to zero; generating a first adjusted score by adding to the score value a likelihood of seeing the acceleration value and the angular velocity value in a context; and generating a second adjusted score value be adding to the first adjusted score value a negative squared distance from each data point of said LiDAR point cloud to a closest edge of the cuboid.

The particle filter algorithm may also be configured to: generate an initial cuboid encompassing at least some data points in the LiDAR point cloud; randomly select different sets of acceleration and angular velocity values; create a set of cuboids using the initial cuboid and the different sets of acceleration and angular velocity values; determine a score for each cuboid of the set of cuboids that indicates a likelihood that the cuboid would be created given the respective one of the different sets of acceleration and angular velocity values; identify scores that are less than a maximum score minus a threshold value; and/or remove cuboids from the set of cuboids that are associated with the scores which were identified.

The implementing systems can comprise: a processor; and a non-transitory computer-readable storage medium comprising programming instructions that are configured to cause the processor to implement a method for operating an autonomous robot (e.g., an autonomous vehicle) or other mobile platform (e.g., an articulating arm coupled to a mobile or fixed base).

The present solution has many advantages. Goals of the present solution are to accelerate track labeling and produce quality tight cuboids. A current implementation for track labeling uses linear interpolation between consecutive key frames and required approximation by piecewise linear movement during an acceleration of an autonomous vehicle. Multiple key frames are required for non-linear motion. The non-realistic larger extent of the user label allows for this since the LiDAR data points can shift around inside cuboids. The labelers still need multiple key frames during an acceleration or rotation. The novel particle filter algorithm of the present solution uses interpolation requiring less manual interaction, decreases the time required for labeling objects, allows for tighter fitting cuboids, produced more realistic dynamical behavior, and produced better quality data.

Notably, the present solution is being described herein in the context of an autonomous robots (e.g., autonomous vehicles). The present solution is not limited to autonomous robot applications. The present solution can be used in other applications.

Illustrative Systems

Referring now to FIG. 1, there is provided an illustration of an illustrative system 100. System 100 comprises a vehicle 102$_1$ that is traveling along a road in a semi-autonomous or autonomous manner. Vehicle 102$_1$ is also referred to herein as an AV. The AV 102$_1$ can include, but is not limited to, a land vehicle (as shown in FIG. 1), an aircraft, a watercraft or a spacecraft.

AV 102$_1$ is generally configured to detect objects in proximity thereto. The objects can include, but are not limited to, a vehicle 102$_2$, a cyclist (not shown) (such as a rider of a bicycle, electric scooter, motorcycle, or the like) and/or a pedestrian (not shown). The object detection may be achieved using machine learning algorithms that were trained with tracks determined in accordance with the present solution. Each track comprises a plurality of cuboids. The manner in which the tracks are determined or otherwise generated will become evident as the discussion progresses. Still, it should be understood that the tracks are determined/generated using LiDAR datasets generated by a LiDAR detector which may be onboard the AV $102_1$ and/or onboard another platform.

The LiDAR detector generally measures the distance to an object $102_2$ by illuminating the object $102_2$ with light 104 (e.g., a laser light) and measuring the reflected light 106 with a sensor. The LiDAR detector generates LiDAR datasets at a plurality of times t, t+1, t+2, . . . , t+n. Each LiDAR dataset is also referred to herein as a frame of LiDAR data. The frames LiDAR data are processed by an onboard computing device of the AV $102_1$ and/or by a remote computing device 110 to generate cuboids for objects given the LiDAR datasets. In this regard, the LiDAR datasets may be communicated from the AV $102_1$ to the remote computing device 110 over a network 108 (e.g., the Internet) via wired and/or wireless connections. The LiDAR datasets may also be stored in a memory of the AV $102_1$, which may be manually removed from the AV $102_1$ and connected to the remote computing device 110. The LiDAR datasets may additionally be stored in a remote datastore 112 (e.g., a database). The cuboids for the objects are then used to train machine learning algorithms for making object detections and/or object trajectory predications/possibilities.

When such an object detection is made using the trained machine learning algorithm, AV $102_1$ performs operations to: generate one or more possible object trajectories for the detected object; analyze the generated possible object trajectory(ies) to determine a trajectory for the AV $102_1$; and cause the AV $102_1$ to follow the trajectory.

Figure 2:
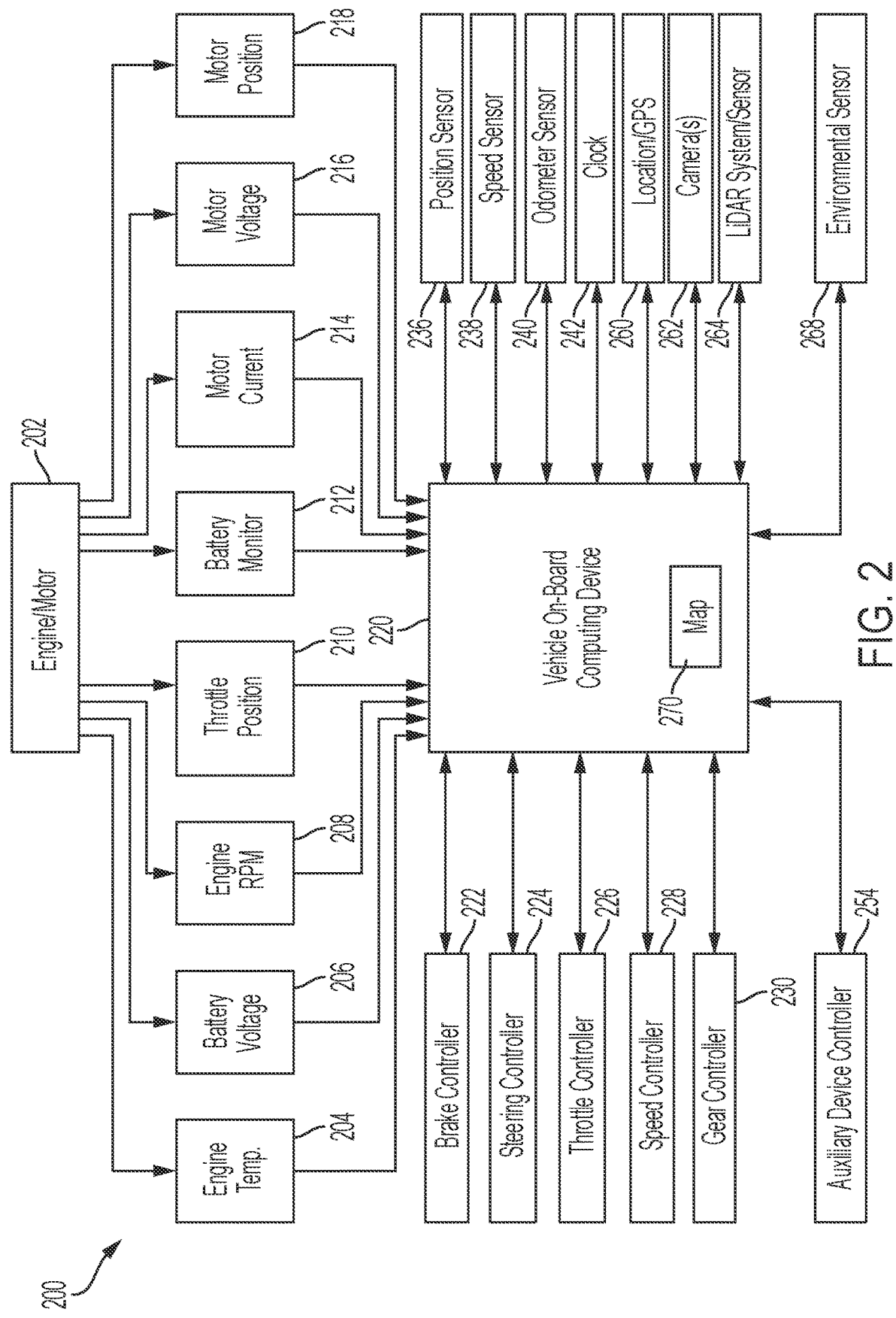
FIG. 2 is an illustration of an architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 (e.g., resolvers and encoders).

Operational parameter sensors that are common to both types of vehicles include, for example, a position sensor 236 (e.g., an accelerometer, gyroscope and/or inertial measurement unit), a speed sensor 238, and/or an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the vehicle on-board computing device 220, which may then access a map of the environment that corresponds to the location information to determine known fixed features of the environment such as a ground surface, streets, buildings, stop signs and/or stop/go signals. Captured images from the cameras 262 and/or object detection information captured from sensors such as LiDAR sensor system 264 is communicated from those sensors to the vehicle on-board computing device 220. The object detection information and/or captured images are processed by the vehicle on-board computing device 220 to detect objects in proximity to the vehicle 200. Any known or to be known technique for making an object detection based on sensor data and/or captured images can be used in the embodiments disclosed in this document.

When the vehicle on-board computing device 220 detects a moving object, the vehicle on-board computing device 220 will generate one or more possible object trajectories for the detected object, and use the possible object trajectories to determine a vehicle trajectory for the AV. The vehicle on-board computing device 220 then performs operations to cause the AV to follow the defined vehicle trajectory. For example, the vehicle on-board computing device 220 uses the object trajectory information to decide what space has been occupied by the object, and then generates a vehicle trajectory in which the AV is not planned to travel to that space.

Figure 3:
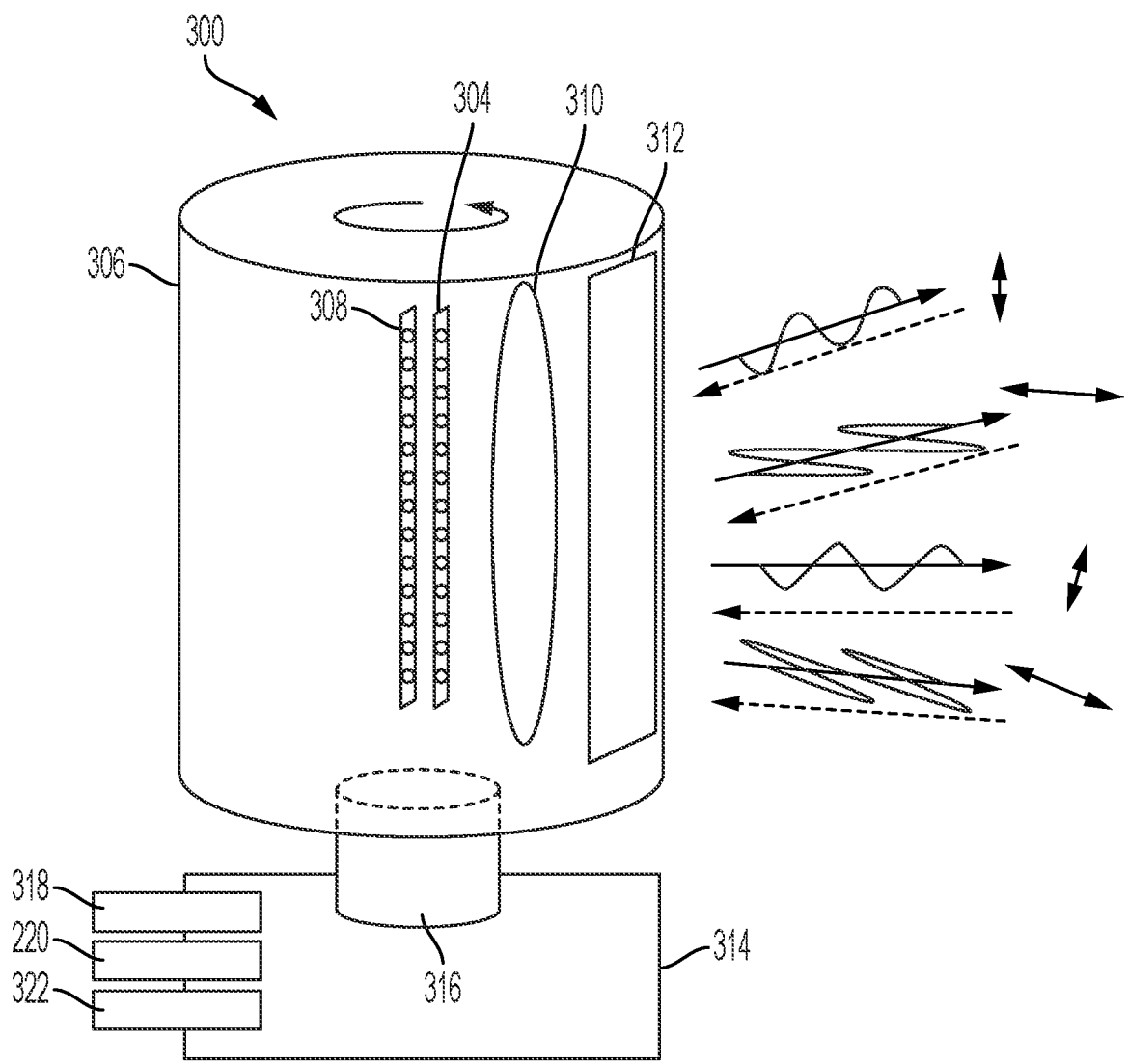
FIG. 3 is an illustration of an architecture for a LiDAR system.

Referring now to FIG. 3, there is provided an illustration of a LiDAR system 300. LiDAR sensor system 264 of FIG. 2 may be the same as or substantially similar to the LiDAR system 300. As such, the discussion of LiDAR system 300 is sufficient for understanding LiDAR sensor system 264 of FIG. 2.

As shown in FIG. 3, the LiDAR system 300 includes a housing 306 which may be rotatable 360° about a central axis such as hub or axle. The housing may include an emitter and aperture(s) 312 made of a material transparent to light. Although a single aperture is shown in FIG. 3, the present solution is not limited in this regard. In other scenarios, multiple apertures for emitting and/or receiving light may be provided. Either way, the LiDAR system 300 can emit light through the aperture(s) 312 and receive reflected light back toward the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture(s) 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system 300 will also include a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or wave plates that focus and direct light that is passed through the optical element structure(s) 310.

One or more optical element structures 310 may be positioned in front of a mirror 312 to focus and direct light that is passed through the optical element structure(s) 310. As shown below, the system includes optical element structure(s) 310 positioned in front of the mirror 312 and connected to the rotating elements of the system so that the optical element structure(s) 310 rotate(s) with the mirror 312. Alternatively or additionally, the optical element structure(s) 310 may include multiple such structures (e.g., lenses and/or wave plates). Optionally, multiple optical element structure(s) 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave wave plate to perform the separation and ensure that received light is directed to the receiver unit rather than to the emitter system (which could occur without such a wave plate as the emitted light and received light should exhibit the same or similar polarizations).

The LiDAR system 300 will include a power unit 318 to power the light emitter system 304, a motor 316, and electronic components. The LiDAR system will also include an analyzer 314 with elements such as a processor 322 and non-transitory computer-readable memory 320 containing programming instructions that are configured to enable the system to receive data collected by the light detector 308, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
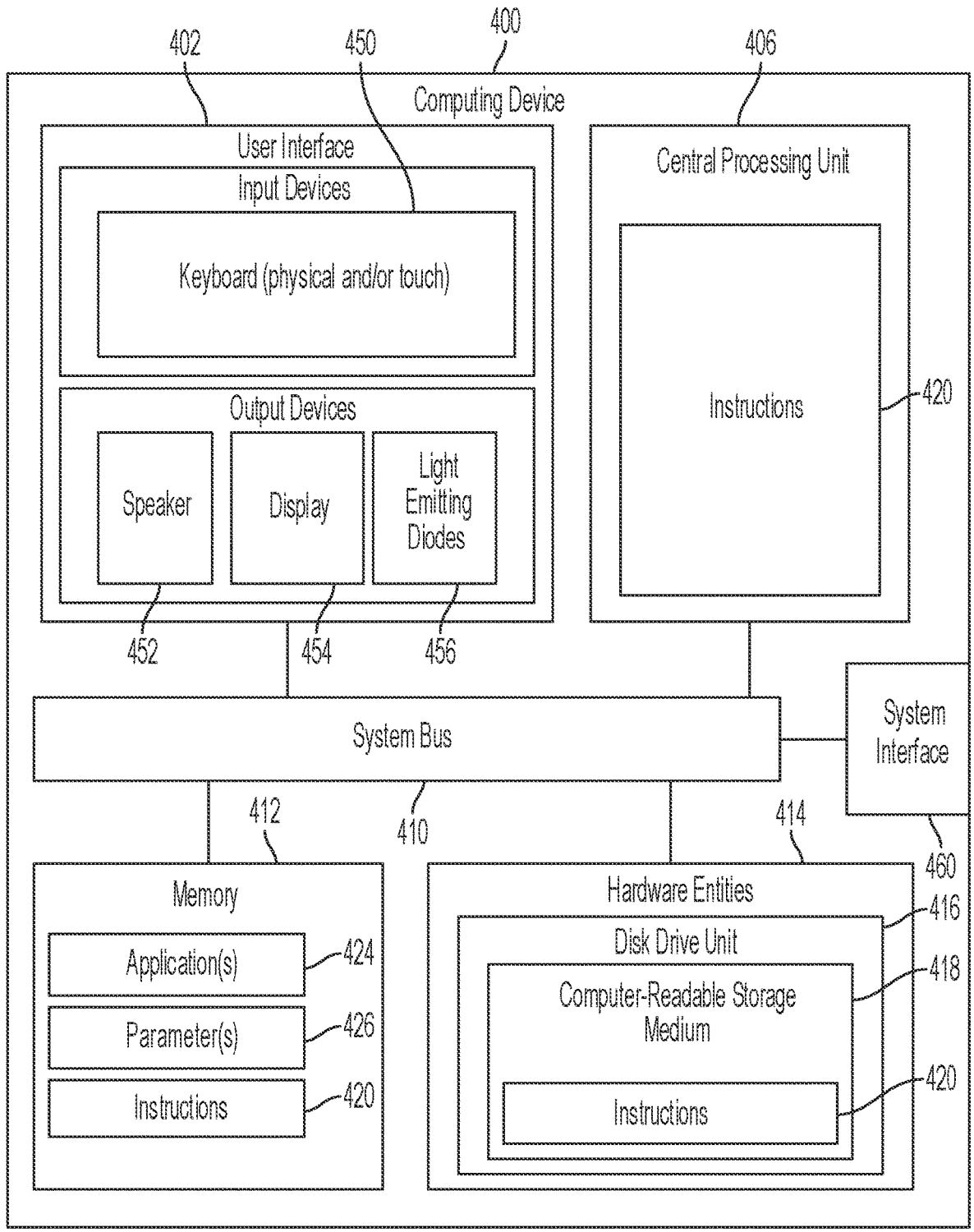
FIG. 4 is an illustration of a computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 400. As such, the discussion of computing device 400 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to (i) train a machine learning algorithm or other algorithm and/or (ii) operate a vehicle using a trained machine learning algorithm, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
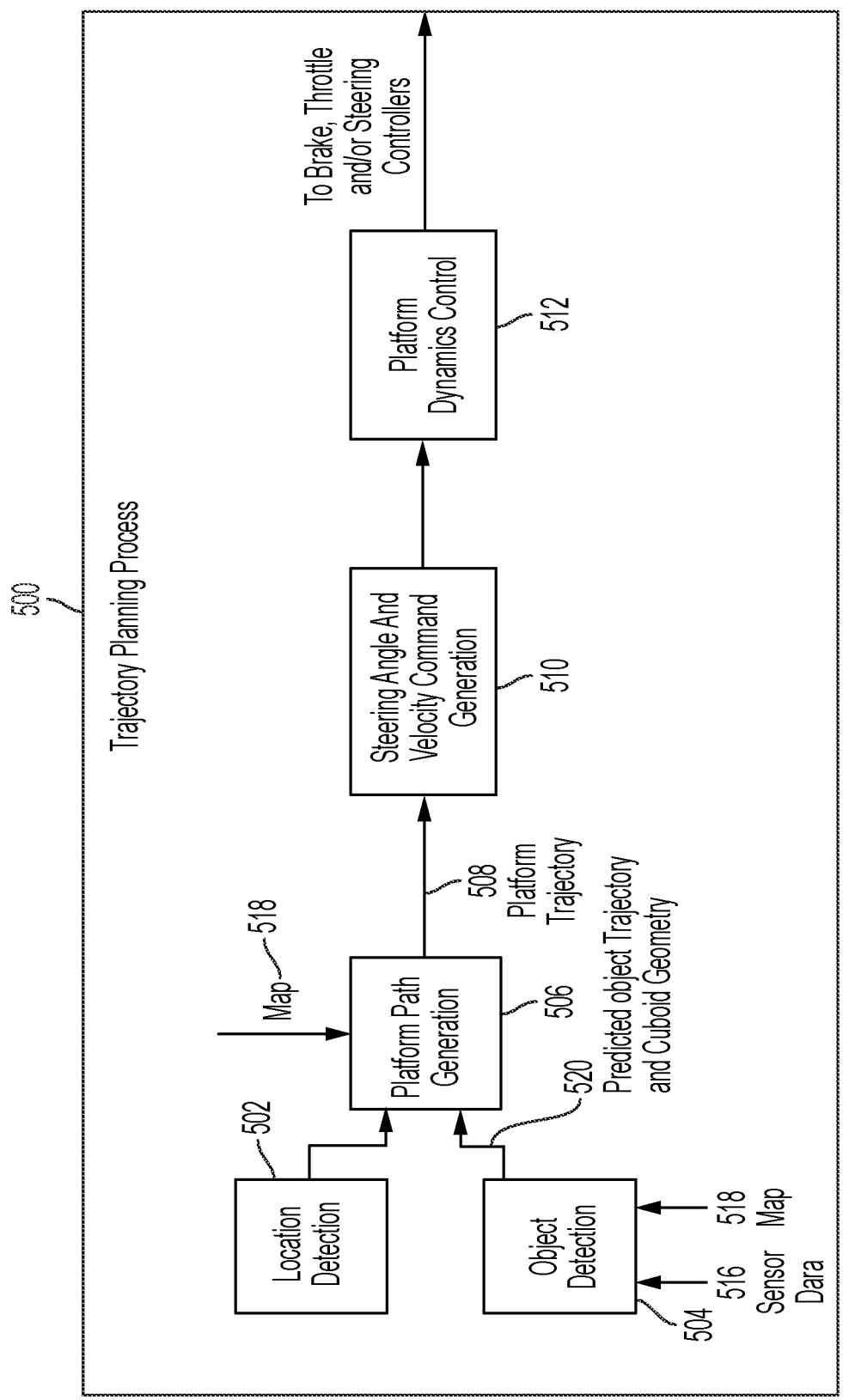
FIG. 5 provides a block diagram of an illustrative vehicle trajectory planning process.

Referring now to FIG. 5, there is provided a block diagram that is useful for understanding how movement of an autonomous robot (e.g., an AV) and/or other mobile platform may be achieved in accordance with the present solution. All of the operations performed in blocks 502-512 can be performed by the on-board computing device of the autonomous robot (e.g., AV 102₁ of FIG. 1) and/or other mobile platform.

In block 502, a location of the autonomous robot (e.g., AV 102₁ of FIG. 1) is detected. This detection can be made based on sensor data output from a location sensor (e.g., location sensor 260 of FIG. 2) of the autonomous robot. This sensor data can include, but is not limited to, GPS data. The detected location of the autonomous robot is then passed to block 506.

In block 504, an object (e.g., vehicle 102₂ of FIG. 1) is detected within proximity of the autonomous robot (e.g., <100+ meters). This detection is made based on sensor data output from camera(s) (e.g., camera(s) 262 of FIG. 2) of the autonomous robot or another device, and/or a LiDAR system (e.g., LiDAR sensor system 264 of FIG. 2) of the autonomous robot or another device. For example, image processing is performed to detect an instance of an object of a certain class (e.g., a vehicle or pedestrian) in one or more images. LiDAR datasets are also processed to detect instances of objects of certain classes represented by point cloud data. Such sensor data processing can be achieved using machine learning algorithms that are trained based on tracks comprising cuboids generated/produced in accordance with the present solution. The machine learning algorithms are trained to detect patterns in images and/or LiDAR datasets which identify objects of a given classes (e.g., a vehicle or pedestrian). Any machine learning algorithm can be used here. For example, one or more of the following machine learning algorithms is employed here: supervised learning; unsupervised learning; semi-supervised learning; and reinforcement learning.

Additionally, a predicted trajectory is determined in block 504 for the object. The object's trajectory is predicted in block 504 based on results of the machine learning algorithms (e.g., an object class), a cuboid geometry, a track (defined by cuboids over time), and/or contents of a map 518 (e.g., a road/terrain map 270 of FIG. 2 including information specifying sidewalk locations, lane locations, lane directions of travel, driving rules, etc.).

The cuboid geometry is determined using the LiDAR dataset, images and/or the map 518. Techniques for predicting object trajectories based on cuboid geometries are well known in the art. Any known or to be known technique for predicting object trajectories based on cuboid geometries can be used herein without limitation. For example, one technique involves predicting that the object is moving on a linear path in the same direction as the heading direction of the cuboid. The predicted object trajectories can include, but are not limited to, the following trajectories:

- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the autonomous robot) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the autonomous robot) for the object.

The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 520 specifying the object's predicted trajectory and the cuboid geometry is provided to block 506. In some scenarios, a classification of the object is also passed to block 506. In block 506, a platform trajectory is generated using the information from blocks 502 and 504. Techniques for determining a platform trajectory using cuboid(s) are well known in the art. Any known or to be known technique for determining a platform trajectory using cuboid(s) can be used herein without limitation. For example, in some scenarios, such a technique involves determining a trajectory for the autonomous robot that would pass the object when the object is in front of the autonomous robot, the cuboid has a heading direction that is aligned with the direction in which the autonomous robot is moving, and the cuboid has a length that is greater than a threshold value. The present solution is not limited to the particulars of this scenario. The platform trajectory 508 can be determined based on the location information from block 502, the object detection information from block 504, and/or map 518 (which may be pre-stored in a data store of the autonomous robot). The platform trajectory 508 may represent a smooth path that does not have abrupt changes that would otherwise provide passenger discomfort. For example, the platform trajectory is defined by a path of travel along a given lane of a road in which the object is not predicted travel within a given amount of time. The platform trajectory 508 is then provided to block 510.

In block 510, a steering angle and velocity command is generated based on the platform trajectory 508. The steering angle and velocity command is provided to block 512 for platform dynamics control, i.e., the steering angle and velocity command causes the autonomous robot to follow the platform trajectory 508.

Illustrative Methods

Figure 6:
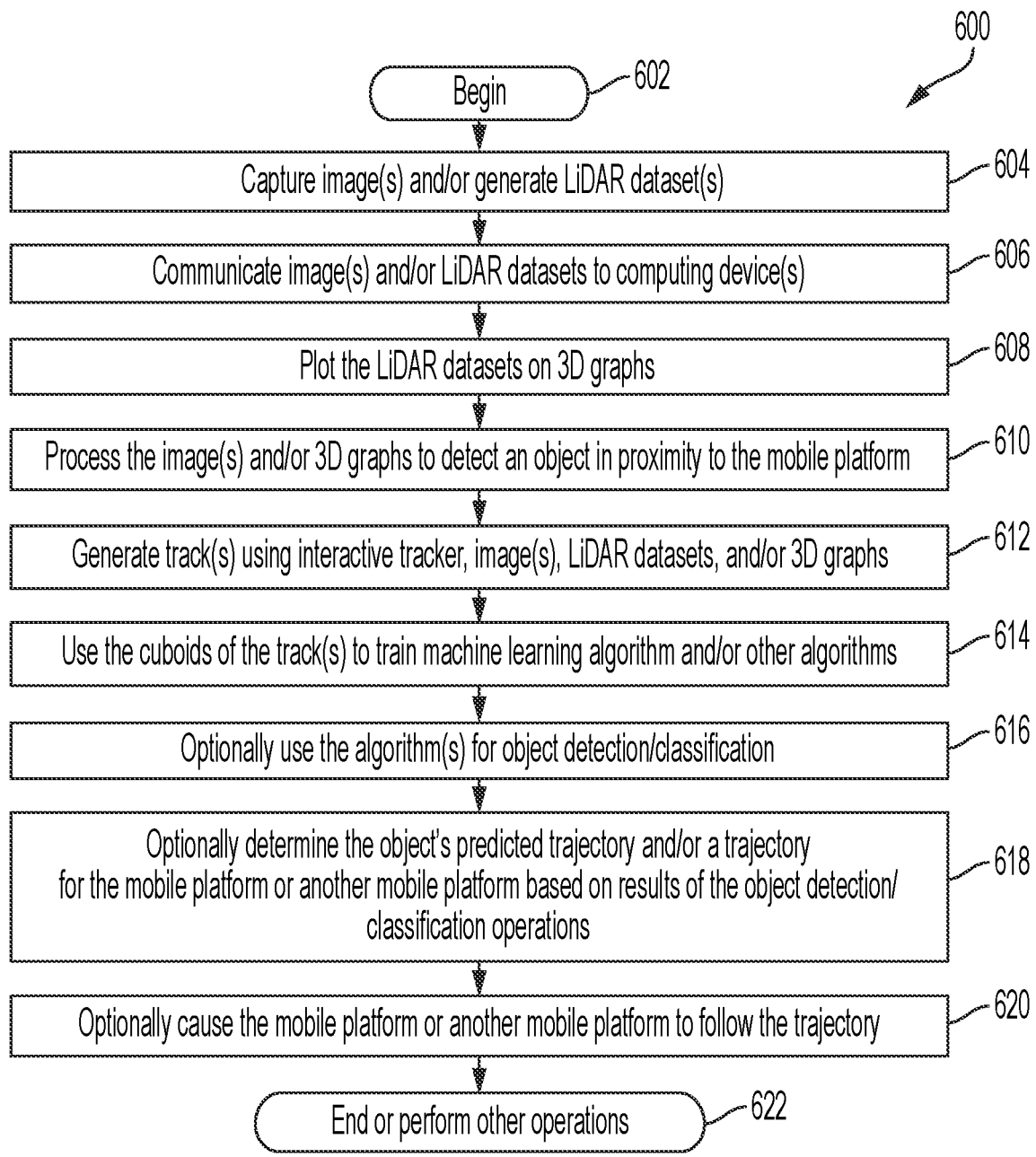
FIG. 6 provides a flow diagram of an illustrative method for training machine learning algorithms and/or operating a vehicle.

Referring now to FIG. 6, there is provided a flow diagram of an illustrative method 600 for training an algorithm and/or operating a mobile platform in accordance with the present solution. Method 600 begins with 602 and continues with 604 where a mobile platform (e.g., an autonomous robot such as AV 102₁ of FIG. 1) performs operations to capture at least one image and/or generate at least one LiDAR dataset. The image(s) and/or LiDAR dataset(s) is(are) communicated in 606 to one or more computing devices (e.g., remote computing device 110 of FIG. 1 and/or vehicle on-board computing device 220 of FIG. 2).

At the computing device(s), the LiDAR dataset(s) is(are) plotted on 3D graph(s) as shown by 608. Each 3D graph has an x-axis, a y-axis and a z-axis with an origin defined at a center of a LiDAR sensor, the x-axis pointing forward and the z-axis pointing upward. An illustration of a LiDAR dataset 702 plotted on a graph 700 is provided in FIG. 7. Notably, graph 700 only shows the 2D point of view from the x-axis and the z-axis for ease of illustration. Techniques for plotting LiDAR datasets on 3D graphs are well known in the art, and therefore will not be described here. Any known or to be known technique for plotting LiDAR datasets on 3D graphs can be used here.

The image(s) and/or 3D graph(s) are used in 610 to detect an object that is located in proximity to the mobile platform. This detection can be made manually by an individual or automatically/automatedly by the computing device(s). In the manual scenarios, one or more individuals analyze the 3D graphs displayed on a screen of the computing device(s) to identify data points that appear to define an object. In the automatic/automated scenarios, the computing device(s) can employ any known or to be known algorithm to identify data points that appear to define an object. Machine learning algorithms can be used here to facilitate the object detection(s) and/or classification(s). Such machine learning algorithms are well known.

Track(s) is(are) defined in 612 using interactive tracker, the images, the LiDAR datasets and/or the 3D graphs. Operations of the interactive tracker will be discussed in detail below in relation to FIGS. 8-10. Each track comprises a plurality of cuboids that are temporally arranged. Each cuboid comprises a 3D oriented bounded box that represents (i) a heading of the object (e.g., object $102_2$ of FIG. 1), (ii) the full extent of the object (e.g., object $102_2$ of FIG. 1), and/or the center/centroid of the object. In this regard, the cuboid encompasses the LiDAR data points in the 3D graph that are associated with a given object.

Figure 7:
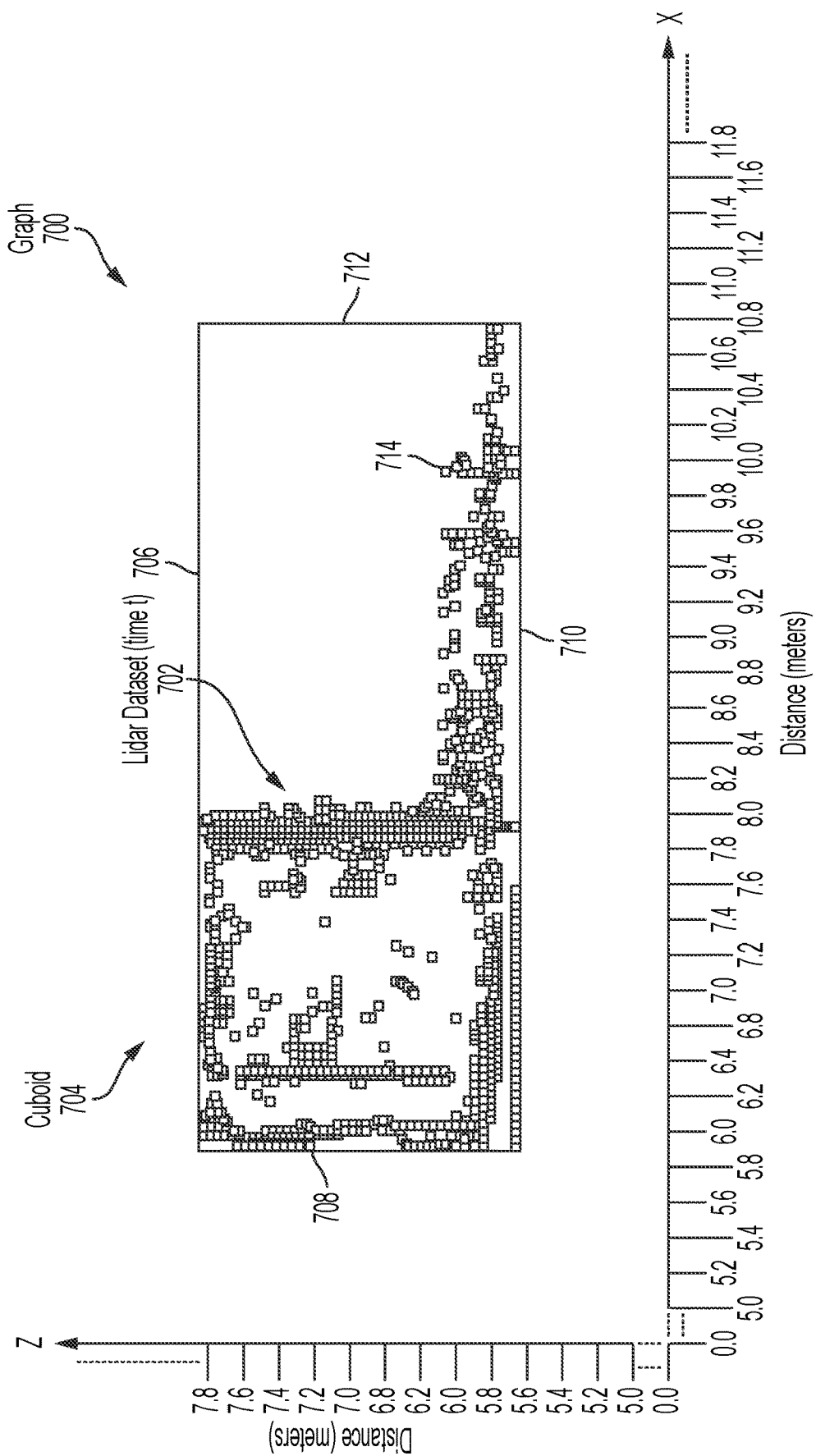
FIG. 7 provides a graph including a LiDAR dataset and a cuboid.

An illustration showing a cuboid 704 defined on a graph 700 is provided in FIG. 7. As shown in FIG. 7, data points of a LiDAR dataset 702 reside within the cuboid 704. Notably, the edges 706, 708, 710, 712 of the cuboid touch or are otherwise are in contact with the data points of the LiDAR dataset 702. The present solution is not limited to the particulars of this illustration.

The cuboids of the track(s) and/or 3D graph(s) are then used in 614 to train a machine learning algorithm for object detection/classification purposes, motion prediction purposes, and/or motion planning purposes (e.g., to make predictions as to trajectories for objects). The track(s) may additionally or alternatively be used to train other algorithm(s) such as a track validation algorithm. Methods for training algorithms using track(s), cuboid(s) and 3D graphs are well known.

The trained algorithm(s) may subsequently be used to facilitate movement-related operations of the mobile platform or another mobile platform (e.g., driving-related operations of AV $102_1$ of FIG. 1 or joint control operations of an articulating arm). For example, the trained algorithm(s) can be used for object detection and/or object classification as shown by 616. In 618, an object's predicted trajectory may be determined based on results of the object detection/object classification operations. Additionally or alternatively, a trajectory for the mobile platform or the other mobile platform may be determined based on results of the object detection/object classification/object trajectory generation operations. The mobile platform or the other mobile platform may be caused to follow the trajectory as shown by 620. Subsequently, 622 is performed where method 600 ends or other operations are performed (e.g., return to 602).

Figure 8:
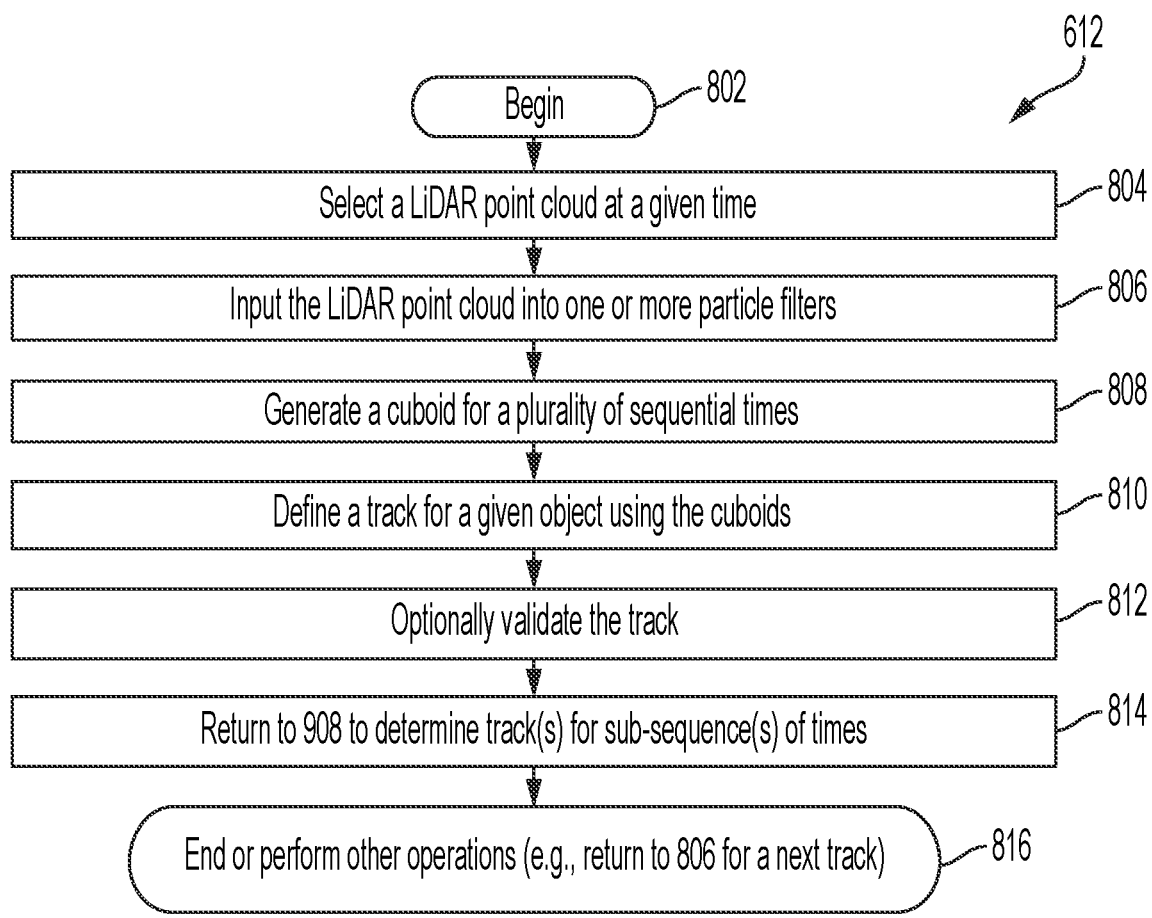
FIG. 8 provides a flow diagram of an illustrative method for determining track(s).

Referring now to FIG. 8, there is provided a flow diagram for generating track(s) in accordance with the present solution. As shown in FIG. 8, operation 612 of FIG. 6 begins with 802 and continues with 804 where a LiDAR point cloud is selected at a given time (e.g., manually by an individual performing user-software interactions or automatically/automatedly by a computing device). In some scenarios, the LiDAR point cloud is processed to remove or otherwise filter ground points therefrom. The ground points can be identified using content of a road/terrain map, a known sensor height, and/or a plane fitting algorithm. Road/terrain maps are well known. The LiDAR point cloud is input into one or more particle filter algorithms as shown by 806.

Each particle filter algorithm uses a set of particles (or samples) to represent a posterior distribution of a stochastic process given noisy and/or partial observations. For example, each particle filter algorithm is configured to generate states of a given object over time, where each state is defined by a position, a velocity and a heading for the given object at a particular time. Thus, each particle filter algorithm is configured to generate a cuboid c for a plurality of sequential times $t_0, t_1, \ldots, t_m$. Each cuboid comprises a position, a velocity and a heading. Thus, the cuboids can be used to generate a set of states for the object.

Figure 13:
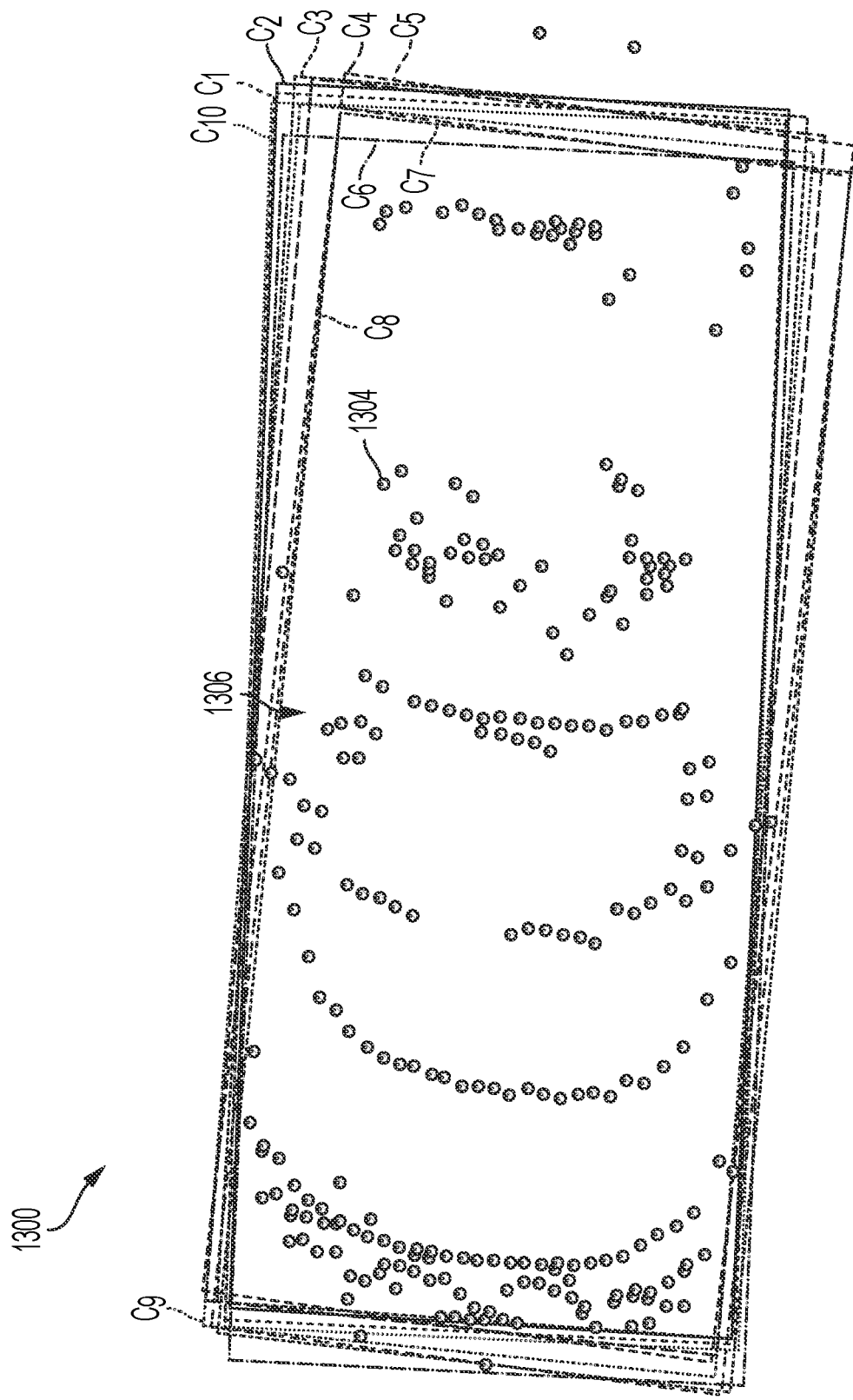
FIG. 13 provides an illustration showing a LiDAR dataset and a set of cuboids generated using the LiDAR dataset.

An illustration showing a set of cuboids 1300 generated by a particle filter algorithm is provided in FIG. 13. The set 1300 comprises cuboids $c_1, c_2, \ldots, c_{10}$ encompassing data points 1304 of LiDAR point cloud 1306. The present solution is not limited in this regard. The set can include any number of cuboids in accordance with a given application. The manner in which the cuboids are generated by the particle filter algorithm(s) will become evident as the discussion progresses.

A track T for a given object is defined in 810 using the cuboids generated in 808. For example, the track T is defined to comprise some or all cuboids $c_1, c_2, \ldots, c_{10}$ shown in FIG. 13. The track T may optionally be validated as shown by 812. If the track is validated, then the track is stored for subsequent use in training machine learning algorithm(s) and/or other algorithm(s). In contrast, if the track is not validated, then the track may be discarded or stored in a manner (e.g., have a flag set to a given value) so that it will not be used to subsequently train the machine learning algorithm(s) and/or other algorithm(s).

Figure 11:
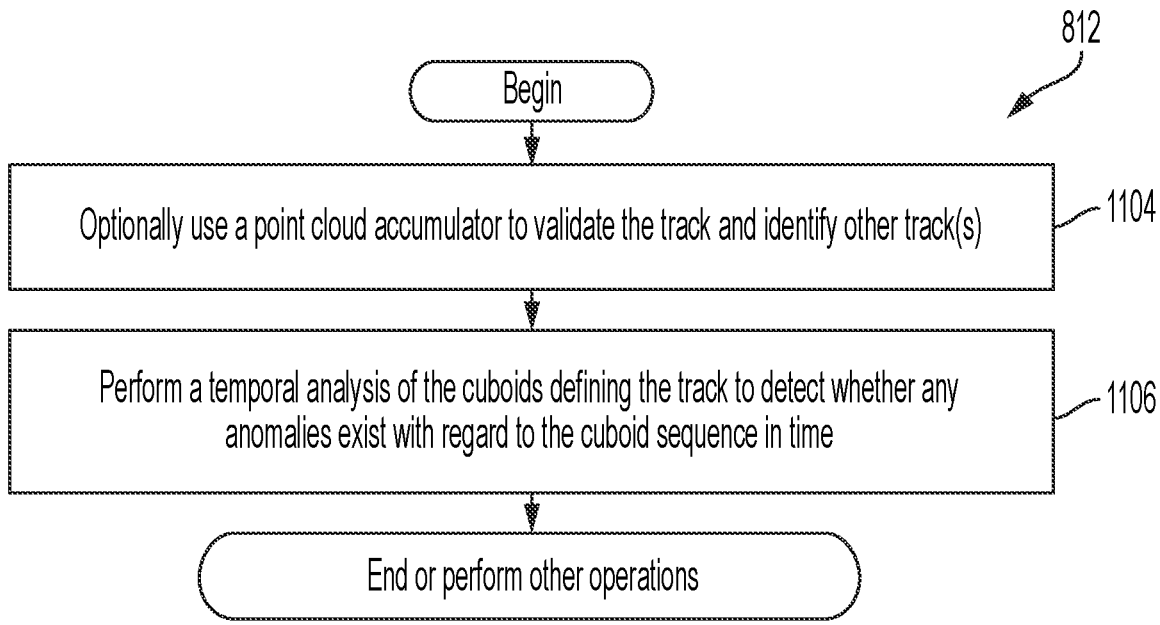
FIG. 11 provides a flow diagram of an illustrative method for validating a track.

The track validation can be achieved in accordance with the process shown in FIG. 11. More specifically, 812 can involve: using a point cloud accumulator in 1104 to validate the track and/or identify other track(s); and/or performing a temporal analysis in 1106 of the cuboids defining the track to detect whether any anomalies exist with regard to the cuboid sequence in time. The anomalies can include, but are not limited to, cases where a cuboid of the track is not surrounding LiDAR data points and/or cases where a heading of a cuboid in the track is different than an expected heading for the object. Point cloud accumulators are well known to perform operations involving the accumulation of LiDAR data points over successive frames and/or cuboids in a track. The point cloud accumulator can validate a correctly tracked object by showing a clear "image" of the object. Fuzzy or smeared out point clouds represent failure.

As shown in FIG. 8, method 800 continues with 814 where track(s) for sub-sequence(s) of times can be generated by performing another iteration of at least 806-810. Subsequently, 816 is performed where method 800 ends or other operations are performed (e.g., return to 806 for generation of a next track for the same or different object).

Figure 9:
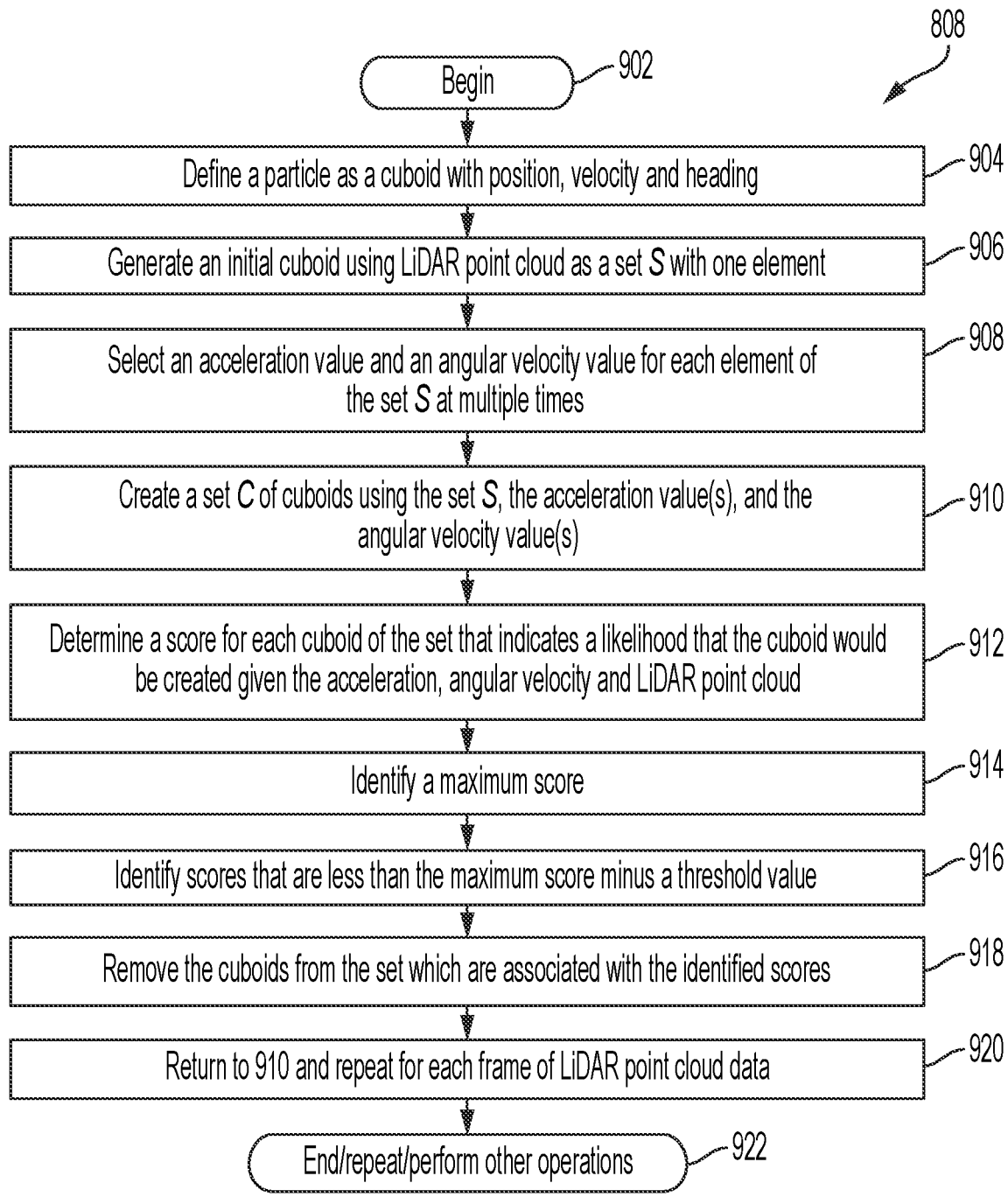
FIG. 9 provides a flow diagram of an illustration method for generating an amodal cuboid using particle filter algorithm(s).

Referring to FIG. 9, there is provided a flow diagram of an illustrative method that is useful for understanding how cuboids are generated in accordance with particle filter algorithm(s) of the present solution. The process of FIG. 9 can be performed in block 808 of FIG. 8.

Operations of the particular filter algorithm(s) begin at 902 and continue to 904 where a definition of a particle is provided. A particle is defined as a cuboid with a position, a velocity and a heading. The cuboid position can be expressed in two dimensions or three dimensions. In the two dimensions scenario, the cuboid position comprises an x-axis coordinate for a center thereof center_x and a y-axis coordinate for the center thereof center_y. In the three dimensions scenario, a z-axis coordinate in also provided for the center of the cuboid. The z-axis coordinate center_z can be determined as the height of the cuboid's center relative to a ground surface specified in a map (e.g., road/terrain map 270 of FIG. 2). The cuboid's velocity is defined by an x-axis coordinate velocity_x and a y-axis coordinate velocity_y. The heading is defined by an angle angle_h.

In 906, an initial cuboid cinitia is generated using the LiDAR point cloud. A set S is defined with the initial cuboid as its only element (i.e., $S=\{c_{initial}\}$). The initial cuboid has a position p, a velocity v and a heading angle $\alpha$ (i.e., $c_{initial}=\{p_{initial}, v_{initial}, a_{initial}\}$). The initial cuboid can be constructed in accordance with known or to be known techniques. For example, in some scenarios, the initial cuboid is constructed by: obtaining pre-defined cuboid dimensions (a length, a width, a height); and setting a center of a cuboid equal to a center of the LiDAR data points associated with the object detected in 610. The cuboid can comprise a 3D shape that (i) encompasses a given percentage (e.g., >90%) of the LiDAR data points of an object and/or (ii) none or a minimal number of the LiDAR data points for other objects (but allowing for the inclusion of LiDAR data points for ground surface). In other scenarios, the initial cuboid is constructed by: fusing the LiDAR point cloud, a vector map and a visual heading; and defining a cuboid along the visual heading with a highest likelihood. The vector map may contain a lane direction which provides a strong indication for a heading of the cuboid. The visual heading may be estimated for an object from camera image(s). Other operations may be performed such as: transforming the coordinates of the cuboid from a first coordinate system to a second different coordinate system; and/or adjusting the coordinates of the cuboid corners to have minimal values for encompassing a given number of LiDAR data points for the object (with a tolerance for outlier LiDAR data points). The first coordinate system may comprise a LiDAR system/sensor coordinate system, i.e., an xyz coordinate system having an origin of the three axes at a center of a LiDAR system/sensor center. The second coordinate system may comprise an xyz coordinate system having an origin of the three axes at a center of an object, the x-axis pointing forward (i.e., towards the heading of the object), and the z-axis pointing upward. Tolerance thresholds may need to be met. For example, 95% of all LiDAR data points for the object need to be included in the cuboid. The present solution is not limited to the particulars of these examples.

In 908, an acceleration value a and an angular velocity value a) for each element of the set S are selected at multiple times $t_0, \ldots, t_g$. The acceleration value can be defined by an x-axis value $a_x$ and y-axis value $a_y$. These values $a_x$, $a_y$ and $\omega$ can be selected randomly using a random number generator (e.g., a Gaussian random number generator), a pseudo-random number generator and/or a chaotic number generator. For example, since set S has a single element $c_{initial}$, an acceleration value $a_{initial}$ and an angular velocity value $\omega_{initial}$ are selected in 908 at times $t_0, \ldots, t_g$ (e.g., $a_{initial-t0}, \ldots, a_{initial-tg}$, and $\omega_{initial-t0}, \ldots, \omega_{inital-tg}$). The present solution is not limited in this regard.

In 910, a set C of cuboids is created using set S, the acceleration value(s) (e.g., $a_{initial-t0}, \ldots, a_{initial-tg}$) and the angular velocity value(s) (e.g., $\omega_{intital-t0}, \ldots, \omega_{initial-tg}$). Each acceleration value specifies how a velocity of a cuboid in set S (e.g., $c_{initial}$) is to be changed to define another cuboid, and the angular velocity value specifies how the heading of the cuboid in set S (e.g., $c_{initial}$) is to be changed to define the another cuboid. Thus, each transition for the particle filter algorithm is given by, acceleration $a_x$ (variance VAX), acceleration $a_y$ (variance VAY) and angular velocity a) (variance VAV). $a_x$, $a_y$ and $\omega$ may be modeled to come from a Gaussian distribution with zero mean. The variances VAX, VAY and VAV are hyperparameters. In particular, the angular velocity VAV parameter can give stiffness or freedom to turn. Two hyperparameter sets are chosen to be turning or straight with straight having a greater stiffness and turning being required for turns.

Figure 12:
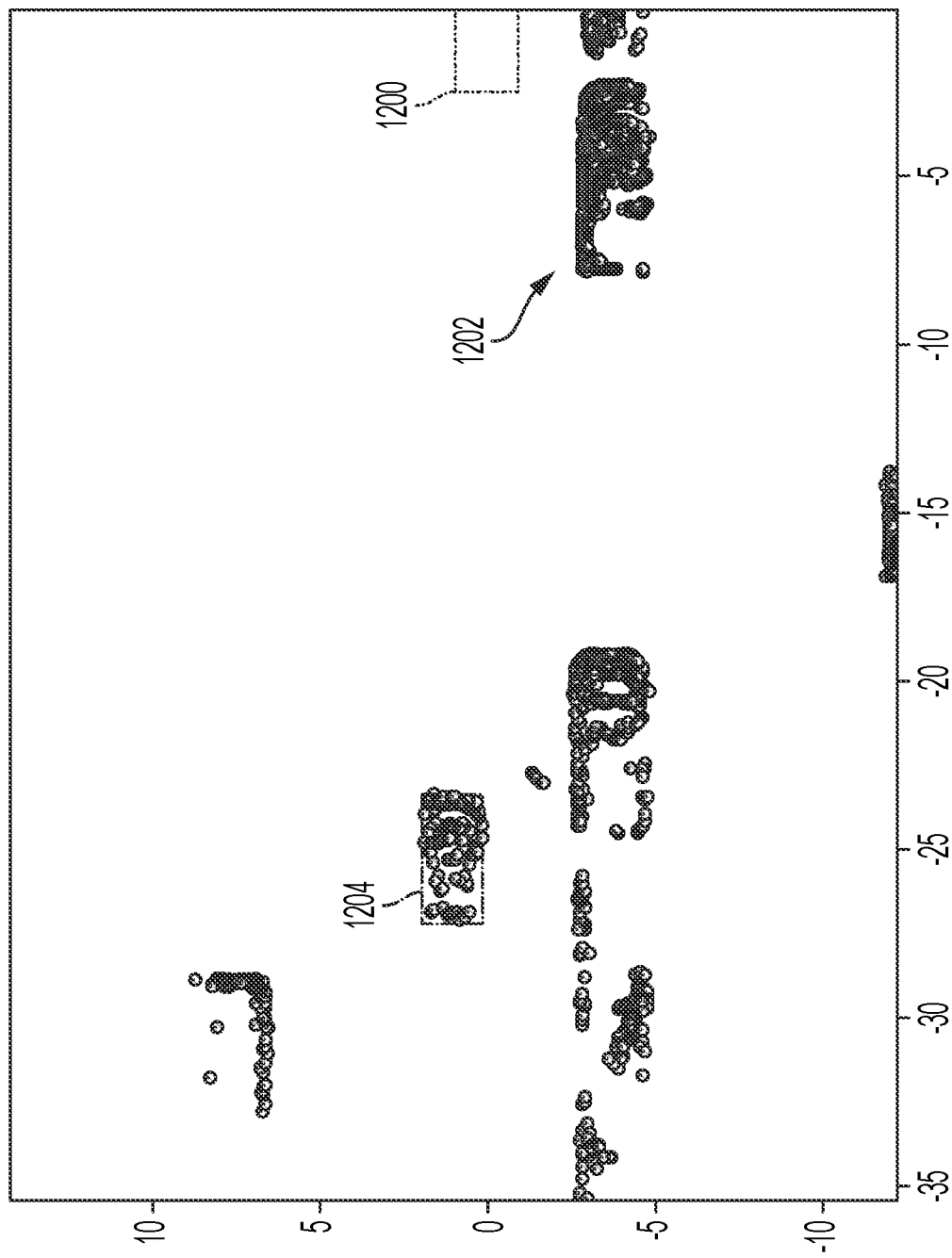
FIG. 12 provides an illustration that is useful for understanding how a cuboid is generated in accordance with a particle filter algorithm.

An illustration is provided in FIG. 12 which shows LiDAR data being collected by a mobile platform 1200 (e.g., AV 102$_1$ of FIG. 1). The LiDAR data defines LiDAR point clouds 1202. A cuboid 1204 is created by the particle filter algorithm. The cuboid 1204 can be included in set 1300 of FIG. 13. Set C created in 910 can include set 1300 of FIG. 13. The present solution is not limited to the particulars of these illustrations.

Referring again to FIG. 9, the process continues with 912 where a score l is determined for each cuboid of the set C. The score l indicates a likelihood that a cuboid is created given the acceleration value selected in 908, the angular velocity value selected in 908 and the LiDAR point cloud input into the particle filter algorithm. The score l may comprise a sum of log likelihoods of $a_x$, $a_y$ and $v_{angular}$ of all LiDAR data points in a given cuboid. The score l may be defined by the following mathematical equation (1).

$$\iota = \log L(a_x) + \log L(a_y) + \log L(v_{angular}) \quad (1)$$

For example, if ten cuboids $c_1, c_2, \ldots, c_{10}$ are in set C as shown in FIG. 13, then ten scores $l_1, l_{hd\ 2}, \ldots, l_{10}$ are determined or computed in 912. The likelihood values can be computed as follows: let the x-acceleration be chosen from Gaussian(0,sigma_$a_x$); let the y-acceleration be chosen from Gaussian(0,sigma_$a_y$); let the angular velocity be chosen from Gaussian(0,sigma_$a_v$); compute the log-likelihood of the x-acceleration, as a function of q, in accordance with mathematical equation log(Gaussian(0,sigma_$a_x$)(q)); compute the log-likelihood of the y-acceleration, as a function of q, in accordance with mathematical equation log(Gaussian (0,sigma_$a_y$)(q)); and compute the log-likelihood of the angular velocity, as a function of q, in accordance with mathematical equation log(Gaussian(0,sigma_$a_v$)(q)). A final term of the log likelihood (i.e., the likelihood of the point cloud) may be determined by computing a negative sum of the squared distance of each point to the closest edge.

Figure 10:
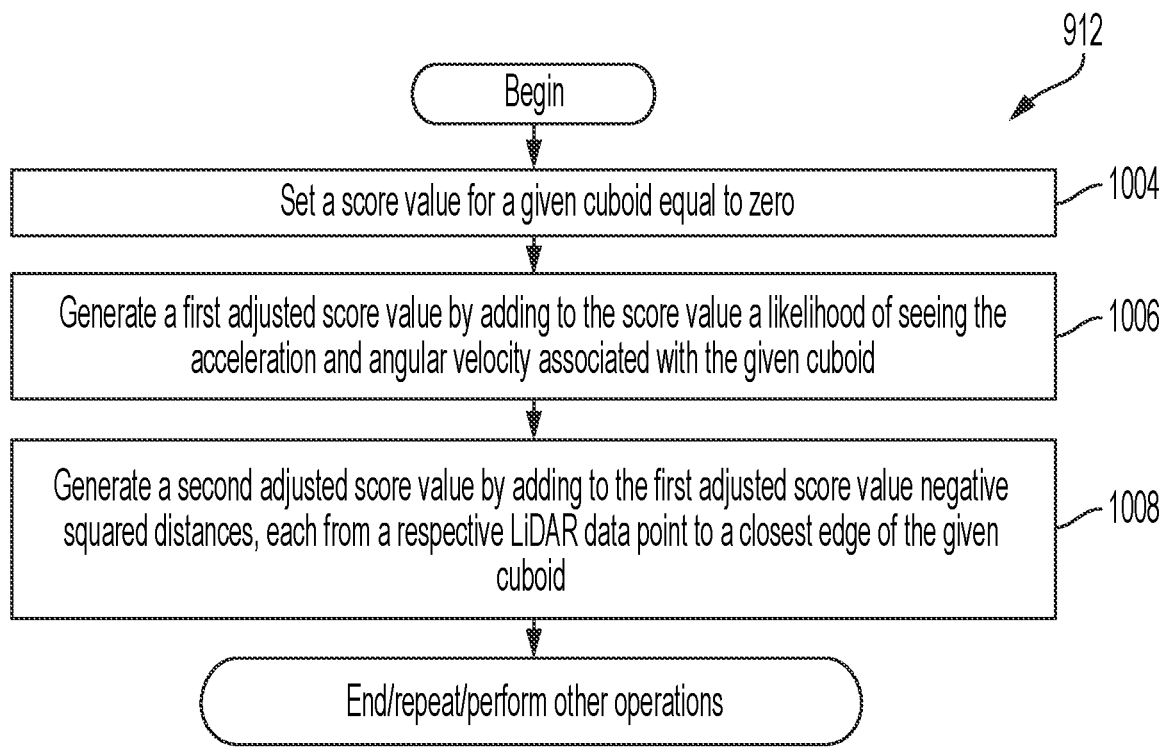
FIG. 10 provides a flow diagram for determining a score for a cuboid.

An illustrative process for determining the score l is provided in FIG. 10. The process involves performing the following operations of blocks 1004-1008: setting a score value for a given cuboid equal to zero (i.e., l=0); generating a first adjusted score by adding to the score value a likelihood of seeing the acceleration and angular velocity (i.e., l determined in 912) associated with the given cuboid in a given context (e.g., a context specified by circumstances that form a setting for an event such as object movement within lane(s), crosswalk(s) and/or sidewalk(s)); and generating a second adjusted score value be adding to the first adjusted score value a negative squared distance from each LiDAR data point (e.g., LiDAR data point 714 of FIG. 7) to a closest edge (e.g., edge 710 of FIG. 7) of the given cuboid (e.g., cuboid 704 of FIG. 7).

As shown in FIG. 9, a maximum score $l_{max\ i}$s identified in 914. The maximum score $l_{max}$ comprises the score (e.g., score $l_2$) with the highest or greatest value of all other scores determined in 912 (e.g., scores $l_1, l_3, \ldots, l_{10}$). Next in 916, the computing device performs operations to identify scores that are less than a number T defined by the following mathematical equation (2).

$$T = l_{max} - thr \quad (2)$$

where thr represents a threshold value which may be predefined or dynamically determined based on certain criteria (e.g., $a_x$, $a_y$, $v_{angular}$, a type of the particle filter algorithm, number of points in the LiDAR point cloud, number of LiDAR data points in the cuboids, etc.). In 918, cuboids are removed from the set C which are associated with the scores identified in 916 (i.e., the scores that are less than the maximum score minus a threshold value). For example, with reference to FIG. 13, the set C is reduced from ten cuboids to eight cuboids. The present solution is not limited in this regard.

As shown by 920, the process can return to 910 so that the particle filter operations are repeated for each frame of LiDAR point cloud data. Subsequently, 922 is performed where the process ends, or other operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a mobile platform, comprising:
   obtaining, by a computing device, a LiDAR point cloud;
   using, by the computing device, the LiDAR point cloud to generate a track for a given object by generating states of a given object over time using a particle filter algorithm, each said state having a score indicating a likelihood that a cuboid would be created given an acceleration value and an angular velocity value; and
   using, by the computing device, the track to train a machine learning algorithm to detect and classify objects based on sensor data.

2. The method according to claim 1, further comprising causing the machine learning algorithm to be used for controlling movement of the mobile platform.

3. The method according to claim 1, wherein each said state is defined by a position, a velocity and a heading for the given object at a particular time.

4. The method according to claim 1, wherein the acceleration value and the angular velocity value comprise random numbers.

5. The method according to claim 1, further comprising generating the score by:
   setting a score value for the cuboid equal to zero;
   generating a first adjusted score by adding to the score value a likelihood of seeing the acceleration value and the angular velocity value in a context; and
   generating a second adjusted score value be adding to the first adjusted score value a negative squared distance from each data point of said LiDAR point cloud to a closest edge of the cuboid.

6. The method according to claim 1, wherein the track is generated by further generating an initial cuboid encompassing at least some data points in the LiDAR point cloud.

7. The method according to claim 6, wherein the track is generated further by randomly selecting different sets of acceleration and angular velocity values.

8. The method according to claim 7, wherein the track is further generated by creating a set of cuboids using the initial cuboid and the different sets of acceleration and angular velocity values.

9. The method according to claim 8, wherein the track is generated by further determining a score for each said cuboid of the set of cuboids that indicates a likelihood that the cuboid would be created given the respective one of the different sets of acceleration and angular velocity values.

10. The method according to claim 9, wherein the track is generated further by: identifying scores of said scores that are less than a maximum score minus a threshold value; and removing said cuboids from the set of cuboids that are associated with the scores which were identified.

11. A system, comprising:
    a processor;
    a non-transitory computer-readable storage medium comprising programming instructions that are configured to cause the processor to implement a method for operating a mobile platform, wherein the programming instructions comprise instructions to:
    obtain a LiDAR point cloud;
    use the LiDAR point cloud to generate a track for a given object by generating states of a given object over time using a particle filter algorithm, each said state having a score indicating a likelihood that a cuboid would be created given an acceleration value and an angular velocity value; and
    use the track to train a machine learning algorithm to detect and classify objects based on sensor data.

12. The system according to claim 11, wherein the programming instructions further comprise instructions to cause the machine learning algorithm to be used for controlling movement of the mobile platform.

13. The system according to claim 11, wherein each said state is defined by a position, a velocity and a heading for the given object at a particular time.

14. The system according to claim 11, wherein the programming instructions further comprise instructions to generate the score by:
    setting a score value for the cuboid equal to zero;
    generating a first adjusted score by adding to the score value a likelihood of seeing the acceleration value and the angular velocity value in a context; and
    generating a second adjusted score value be adding to the first adjusted score value a negative squared distance from each data point of said LiDAR point cloud to a closest edge of the cuboid.

15. The system according to claim 11, wherein the track is generated further by generating an initial cuboid encompassing at least some data points in the LiDAR point cloud.

16. The system according to claim 15, wherein the track is generated further by randomly selecting different sets of acceleration and angular velocity values.

17. The system according to claim 16, wherein the track is generated further by creating a set of cuboids using the initial cuboid and the different sets of acceleration and angular velocity values.

18. The system according to claim 17, wherein the track is generated by further determining a score for each said cuboid of the set of cuboids that indicates a likelihood that the cuboid would be created given the respective one of the different sets of acceleration and angular velocity values.

19. The system according to claim 18, wherein the track is generated further by: identifying scores of said scores that are less than a maximum score minus a threshold value; and removing said cuboids from the set of cuboids that are associated with the scores which were identified.

20. A computer program product comprising a non-transitory memory and programming instructions that are configured to cause a processor to:
- obtain a LiDAR point cloud;
- use the LiDAR point cloud to generate a track for a given object by generating states of a given object over time using a particle filter algorithm, each said state having a score indicating a likelihood that a cuboid would be created given an acceleration value and an angular velocity value; and
- use the track to train a machine learning algorithm to detect and classify objects based on sensor data.

* * * * *